Patented Oct. 11, 1927.

1,645,117

UNITED STATES PATENT OFFICE.

HERMANN SCHLADEBACH, OF DESSAU IN ANHALT, AND HERBERT HÄHLE, OF DESSAU-ZIEBIGK IN ANHALT, GERMANY, ASSIGNORS TO I.-G. FARBENINDUSTRIE AKTIEN-GESELLSCHAFT.

INK.

No Drawing. Application filed January 8, 1926, Serial No. 80,068, and in Germany January 3, 1925.

Besides the known tannin-iron inks and logwood-chrome inks, dyestuff inks have been made in wide variety. For instance, solutions of eosine have been used as red inks, solutions of methyl violet as violet inks, and solutions of acid green as green inks. Even black inks have been made from coal-tar dyes, chiefly from solutions of nigrosine or black acid azo dyes. Substantive cotton dyes have been similarly used.

Such dyes have the disadvantage that the writing produced with them is capable of being wholly or in part washed from the paper by water. In the case of basic and acid dyes for wool, this is only to be expected since they are soluble in water and do not form any compound with the paper or otherwise suffer a change on the paper. However, even substantive dyes which have an affinity for cellulose are not likely to prove of much use as water-proof inks, even though in dyeing cotton they yield water-fast dyeings, because in writing on paper the conditions which prevail are wholly different from those of the dyeing process.

In order to make writing inks fast to water, shellac dissolved in borax solution has been added to dye inks. Such dye solutions are not, however, easily flowing inks which can be used for writing with a pen but India inks which are especially useful for drawing lines.

By the present invention it is possible to make dyeings which are fast to water and are useful for writing from suitable azo-dyes which dye cotton directly by adding to the dye solution a free alkali, for instance potash lye or soda lye. The degree of fastness to water which is achieved and the speed with which the fastness to water is developed after the writing is dry differ with the several dyes. In many cases the writing is fast even within an hour after it is dry; in other cases the same result occurs only after days. The speed of development of fastness to water also depends on the kind of size which is present in the paper used. The presence of resin size causes a much more rapid development of fastness to water than gelatine size. The development of the water proof character of the writing can be greatly accelerated by adding to the dye solution in addition to the alkali a small amount of formaldehyde. Instead of formaldehyde an agent may be used which yields formaldehyde. Dyes which contain free amino- or hydroxyl groups yield inks capable of producing writing which rapidly becomes fast to water without addition of alkali when formaldehyde is present in the dye solution. Certain compounds, such as glycerine, alcohol, phenol, tannin, may be added to the inks, which should be free from precipitates and should contain as small a proportion of salt as possible, in order to vary the duration of drying, the freedom of flow and other properties.

The following examples illustrate the invention without limiting it:

*Example 1.*—20 grams of a dye of a general formula:

Aminonaphtholsulphonic acid $\diagdown$ azo-para-diamine-azo-meta-diamine
$\diagup$ azo-para-diamine-azo-meta-diamine are dissolved in 950 ccm. of distilled water. After cooling and filtering 50 ccm. of 2$n$-sodium hydroxide solution are added and the whole is made up to 1000 ccm. Writing produced with these inks is fast, even to boiling water.

*Example 2.*—About 19 grams of a dye having a general formula given in Example 1 are dissolved in 940 ccm. of boiling distilled water. After cooling and filtering 10 ccm. of a solution of formaldehyde of 30 per cent strength and 50 ccm. of 2$n$-sodium hydroxide solution are added and the whole made up to 1000 ccm. Writing produced with these inks is water-fast in a short time and also is very soon fast to dilute alkali.

*Example 3.*—About 12 grams of a dye of the general formula given in Example 1 containing some sodium carbonate used while preparing the dye are dissolved in 950 ccm. of boiling distilled water. After cooling and filtering 50 ccm. of a formaldehyde solution of 30 per cent strength are added and the solution is made up to 1000 ccm. Writing produced with this ink is completely fast to water after a short time.

*Example 4.*—A mixture of 8.2 grams of a dye of the general formula:

Diaminodiphenylamine $\diagdown$ azo-aminonaphtholsulphonic acid-azo-meta-diamine
$\diagup$ azo-aminonaphtholsulphonic acid-azo-meta-diamine, 2.2 grams of a dye of the formula: 1.4-diaminoarylsulphonic acid-azo-1-aminonaphthalene-azo-aminohydroxynaphthalene sulphonic acid and 1.8 grams of alkali blue (Schultz, "Farbstofftabellen", No. 536), each dye being in concentrated form free from salt, is dissolved in 950 ccm. of boiling water. After cooling and filtering 50 ccm. of 2n-potassium hydroxide solution are added and the whole is made up to 1000 ccm. with distilled water. The writing produced with this ink is water-fast after a short time and after some days is fast to weak alkali.

*Example 5.*—About 10 grams of a dye of the general formula: para-diamine-azo-aminophenolether- azo - aminohydroxynaphthalene sulphonic acid (ammonium salt) containing some alkaline salt used while preparing the dye are dissolved in 950 ccm. of boiling distilled water. After cooling and filtering 50 ccm. of a formaldehyde solution of 30 per cent strength are added. The writing produced with this ink is fast to water and to dilute alkali immediately after drying.

In the appended claims the term "azo-dye which dyes cotton directly" is used to include those azo-dyes which are capable of dyeing cellulose fibers without the aid of a mordant such as tannin and metal salt mordants. In the dyeing industry the dyes of this class are designated "substantive dyes".

What we claim is,—

1. An ink comprising a solution of an azo-dye which dyes cotton directly and a free alkaline agent in a quantity sufficient to render writings produced with the ink fast to water.

2. An ink comprising a solution of an azo-dye which dyes cotton directly, formaldehyde, and a free alkaline agent in a quantity sufficient to render writings produced with the ink fast to water.

3. An ink comprising an aqueous solution of an azo-dye which dyes cotton directly and a free caustic alkali in a quantity sufficient to render writings produced with the ink fast to water.

4. An ink comprising an aqueous solution of an azo-dye which dyes cotton directly, formaldehyde, and a free caustic alkali in a quantity sufficient to render writings produced with the ink fast to water.

In testimony whereof we affix our signatures.

HERMANN SCHLADEBACH.
HERBERT HÄHLE.